US012621274B2

(12) United States Patent
Rangaraj

(10) Patent No.: US 12,621,274 B2
(45) Date of Patent: May 5, 2026

(54) SECURE ENCRYPTION USING TOKENIZED DATA

(71) Applicant: Capital One Services, LLC, McLean, VA (US)

(72) Inventor: Srinivasan Rangaraj, San Jose, CA (US)

(73) Assignee: Capital One Services, LLC, McLean, VA (US)

( * ) Notice: Subject to any disclaimer, the term of this patent is extended or adjusted under 35 U.S.C. 154(b) by 388 days.

(21) Appl. No.: 18/491,073

(22) Filed: Oct. 20, 2023

(65) Prior Publication Data

US 2025/0133066 A1 Apr. 24, 2025

(51) Int. Cl.
*H04L 9/40* (2022.01)
*H04L 9/08* (2006.01)
*H04L 9/14* (2006.01)

(52) U.S. Cl.
CPC ........ *H04L 63/0428* (2013.01); *H04L 9/0869* (2013.01); *H04L 9/14* (2013.01)

(58) Field of Classification Search
CPC ...... H04L 63/0428; H04L 9/0869; H04L 9/14
USPC ......................................................... 713/153
See application file for complete search history.

(56) References Cited

U.S. PATENT DOCUMENTS

| | | | | |
|---|---|---|---|---|
| 8,472,619 B1 | | 6/2013 | Trimberger | |
| 9,800,556 B2 * | | 10/2017 | Steeves ............... | H04L 63/0428 |
| 10,804,980 B1 * | | 10/2020 | Boynton ............. | H04L 63/0272 |
| 11,329,824 B2 * | | 5/2022 | Oosthuizen ........... | H04L 9/0869 |
| 11,570,155 B2 * | | 1/2023 | Hart .......................... | H04L 9/30 |
| 12,388,624 B2 * | | 8/2025 | Choi ...................... | H04L 9/0825 |
| 2016/0301669 A1 * | | 10/2016 | Muma .................. | H04L 63/0428 |
| 2019/0268145 A1 * | | 8/2019 | Barth .................... | H04L 9/0838 |
| 2023/0300120 A1 * | | 9/2023 | Cheng .................. | H04L 63/045 |
| | | | | 713/171 |

FOREIGN PATENT DOCUMENTS

EP     1724933 A1     11/2006

OTHER PUBLICATIONS

Extended European Search Report for European Application No. EP242067049 dated Mar. 20, 2025, 7 pages.

(Continued)

*Primary Examiner* — Amare F Tabor
(74) *Attorney, Agent, or Firm* — Harrity & Harrity, LLP

(57) ABSTRACT

In some implementations, a device may receive a request for cryptographic transmission of payload data. The device may obtain the payload data for encryption. The device may encrypt the payload data, to generate encrypted payload data, using a first encryption key, wherein the first encryption key is configured such that the encrypted payload data is decryptable using a second encryption key that corresponds to the first encryption key. The device may generate tokenized data. The device may combine, using a combining algorithm of a set of combining algorithms, the encrypted payload data and the tokenized data to generate combined data, wherein the combined data is not directly decryptable using the second encryption key. The device may provide the combined data and an indicator of the combining algorithm as a response to the request.

20 Claims, 6 Drawing Sheets

(56) References Cited

OTHER PUBLICATIONS

Murthy, T S N., et al.,"Adaptive Secret Key Generation in Underwater Acoustic System", IEEE International Conference on Power, Control, Signals and Instrumentation Engineering (ICPCSI), Sep. 21, 2017, pp. 698-702, XP033362071, DOI: 10.1109/ICPCSI.2017. 8391804.

Nguyen Thi Huyen Trang, et al., "Dynamic Secret Key Generation for Joint Error Control and Security Coding", IEEE Wireless Communications and Networking Conference (WCNC), Apr. 6, 2014, pp. 2940-2945, XP032682744, DOI: 10.1109/WCNC.2014. 6952922.

* cited by examiner

200

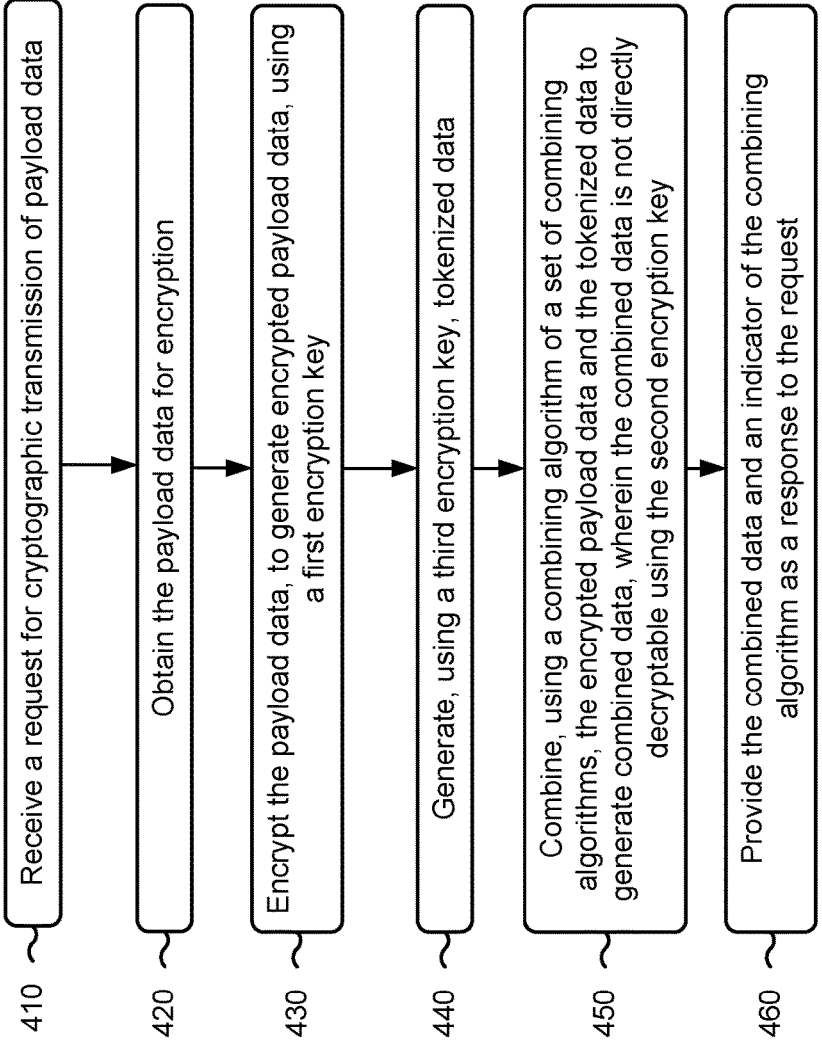

410 — Receive a request for cryptographic transmission of payload data

420 — Obtain the payload data for encryption

430 — Encrypt the payload data, to generate encrypted payload data, using a first encryption key 440 — Generate, using a third encryption key, tokenized data 450 — Combine, using a combining algorithm of a set of combining algorithms, the encrypted payload data and the tokenized data to generate combined data, wherein the combined data is not directly decryptable using the second encryption key 460 — Provide the combined data and an indicator of the combining algorithm as a response to the request

SECURE ENCRYPTION USING TOKENIZED DATA

BACKGROUND

A variety of private information (e.g., security credentials, personal information, health information, or financial information) is exchanged over computer networks (e.g., the Internet) by entities, and is susceptible to theft. Thus, various security techniques are utilized to protect the private information that is exchanged over the computer networks.

SUMMARY

Some implementations described herein relate to a system for cryptographic communication. The system may include one or more memories and one or more processors communicatively coupled to the one or more memories. The one or more processors may be configured to receive payload data for encryption. The one or more processors may be configured to encrypt the payload data, to generate encrypted payload data, using a first encryption key, wherein the first encryption key is configured such that the encrypted payload data is decryptable using a second encryption key that corresponds to the first encryption key. The one or more processors may be configured to generate tokenized data. The one or more processors may be configured to combine, using a combining algorithm, the encrypted payload data and the tokenized data to generate combined data, wherein the combined data is not directly decryptable using the second encryption key. The one or more processors may be configured to output the combined data and an indicator of the combining algorithm.

Some implementations described herein relate to a method of cryptographic communication. The method may include receiving, by a device, a request for cryptographic transmission of payload data. The method may include obtaining, by the device, the payload data for encryption. The method may include encrypting, by the device, the payload data, to generate encrypted payload data, using a first encryption key, wherein the first encryption key is configured such that the encrypted payload data is decryptable using a second encryption key that corresponds to the first encryption key. The method may include generating, by the device, tokenized data. The method may include combining, by the device and using a combining algorithm of a set of combining algorithms, the encrypted payload data and the tokenized data to generate combined data, wherein the combined data is not directly decryptable using the second encryption key. The method may include providing, by the device, the combined data and an indicator of the combining algorithm as a response to the request.

Some implementations described herein relate to a non-transitory computer-readable medium that stores a set of instructions. The set of instructions, when executed by one or more processors of a device, may cause the device to receive payload data for encryption. The set of instructions, when executed by one or more processors of the device, may cause the device to encrypt the payload data, to generate encrypted payload data, using a first encryption key, wherein the first encryption key is configured such that the encrypted payload data is decryptable using a second encryption key that corresponds to the first encryption key. The set of instructions, when executed by one or more processors of the device, may cause the device to encrypt the payload data, to generate tokenized data, using a random encryption key, the random encryption key being different from the first encryption key. The set of instructions, when executed by one or more processors of the device, may cause the device to combine, using a combining algorithm, the encrypted payload data and the tokenized data to generate combined data, wherein the combined data is not directly decryptable using the second encryption key. The set of instructions, when executed by one or more processors of the device, may cause the device to output the combined data via a first message. The set of instructions, when executed by one or more processors of the device, may cause the device to output an indicator of the combining algorithm via a second message.

BRIEF DESCRIPTION OF THE DRAWINGS

FIG. 4 is a flowchart of an example process associated with secure encryption using tokenized data, in accordance with some embodiments of the present disclosure.

DETAILED DESCRIPTION

Figure 1A:
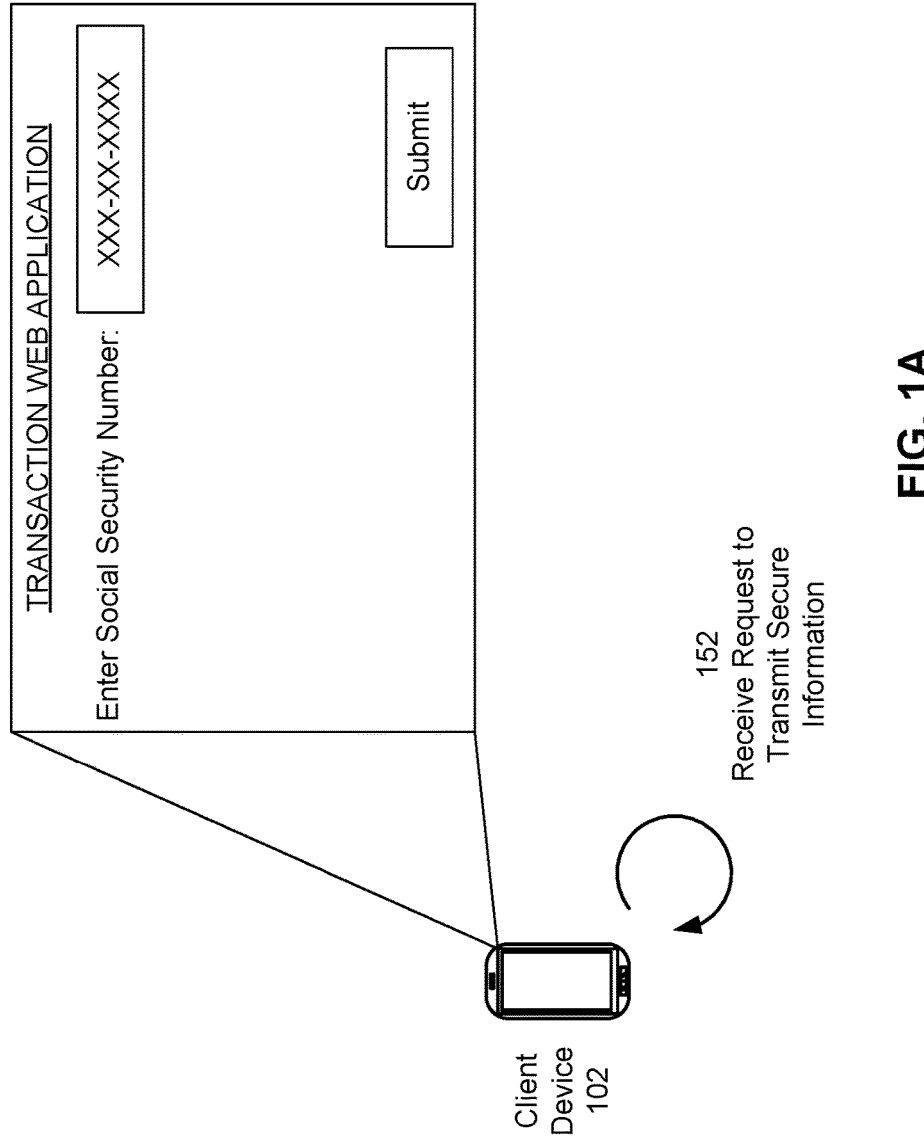
FIGS. 1A-1C are diagrams of an example implementation associated with secure encryption using tokenized data, in accordance with some embodiments of the present disclosure.

The following detailed description of example implementations refers to the accompanying drawings. The same reference numbers in different drawings may identify the same or similar elements.

A variety of encryption and decryption techniques are used to secure private information over computer networks, such as a data encryption standard (DES) technique, a triple-DES technique, an advanced encryption standard (AES) technique, a Rivest-Shamir-Adleman (RSA) algorithm technique, a Blowfish algorithm technique, or a Twofish algorithm technique, among other examples.

The DES technique uses a cipher key for carrying out block encryption. Each data block of plain text has a length of sixty-four bits, and a corresponding cipher text (e.g., encrypted text) block also has the same bit length. The DES technique utilizes a small number of bits in the cipher key to encrypt the data blocks. However, the DES technique fails to provide a high security data encryption scheme, and cipher text blocks, which are encrypted with the cipher key, are relatively easy to decrypt. The triple DES technique is based on the DES technique, but utilizes a longer cipher key and executes the encryption routine three times. However, with advancements in computing technology, even the triple DES is becoming simple enough to decrypt.

The AES technique offers a larger key size, and a number of rounds performed during the execution of the AES technique depends on the key size. Even though the AES technique provides better security than the DES technique and the triple DES technique, the AES technique is still limited. For example, the AES technique specifies and uses identical parameters for various rounds of encryption, which make the AES technique susceptible to compromise especially with advancements in computing technology. RSA is a public-key cryptography, which uses asymmetric encryption for secure key exchange and digital signatures. Twofish and Blowfish are symmetric encryption techniques, which can be used for disk encryption and secure communications, that provide performance flexibility and control of encryption speed.

Traditional cryptography, such as the above-mentioned techniques, rely on the difficulty of certain mathematical problems to provide security. However, quantum computing advances provide the potential for complex mathematical problems to be solved in relatively short periods of time, which may undermine the security of traditional cryptography techniques. Accordingly, the potential realization of large-scale, fault-tolerant quantum computers threatens the confidentiality and integrity of sensitive data that is protected by current cryptographic protocols for, for example, secure communications.

Some implementations described herein use tokenized data to provide secure encryption. For example, a client device may combine an encrypted dataset with a tokenized dataset to generate a combined dataset. The client device may transmit the combined dataset and an indicator of a combining algorithm used to generate the combined dataset. In this case, the server device may use the indicator of the combining algorithm to identify and remove the tokenized data from the combined dataset and perform decryption on the encrypted dataset, thereby enabling recovery of underlying data. In this case, based on using the combining algorithm to obfuscate the underlying encrypted data with tokenized data, the client device and server device enable secure cryptograph, which is more resistant to quantum computing.

Figure 1B:
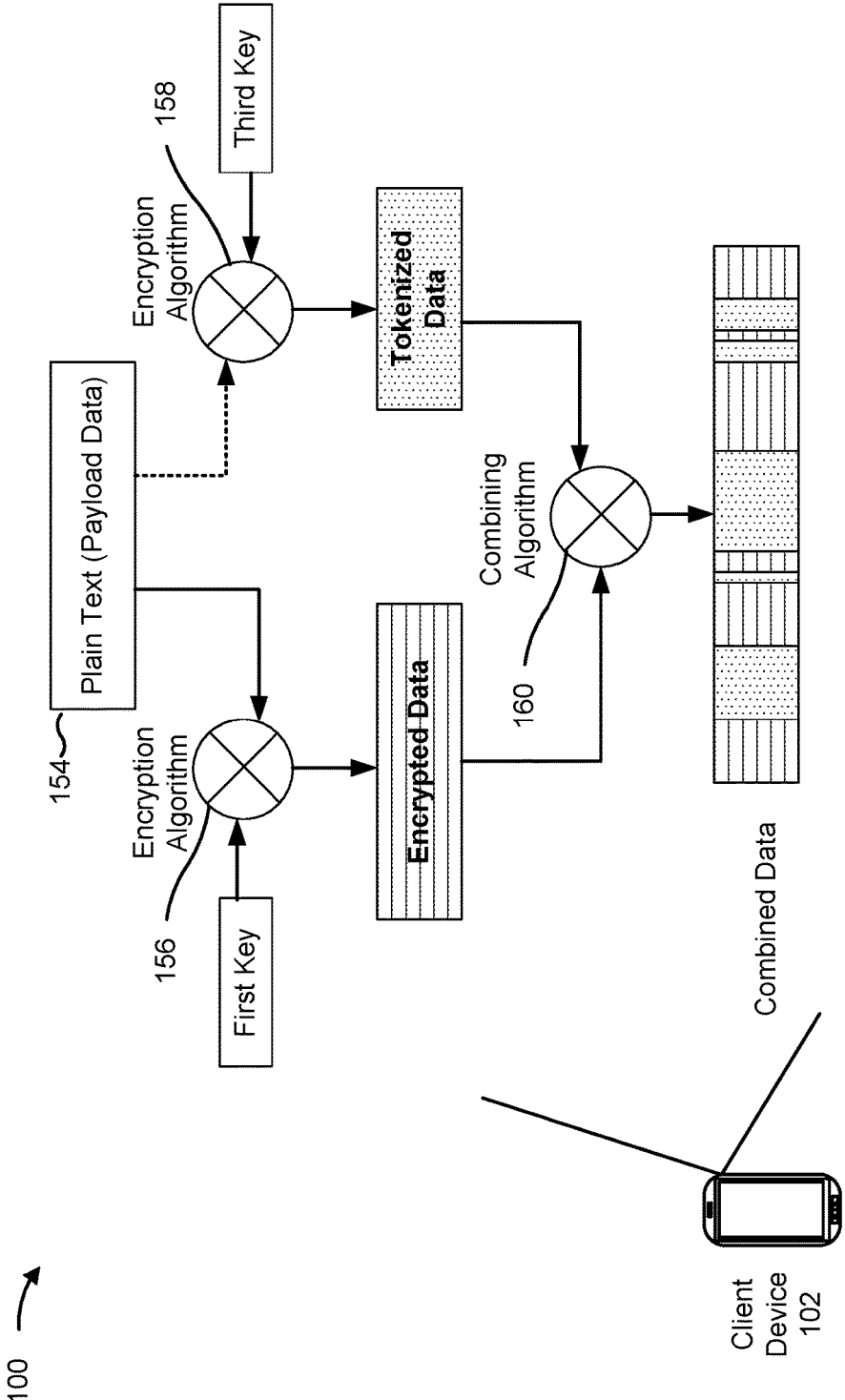
Figure 1C:
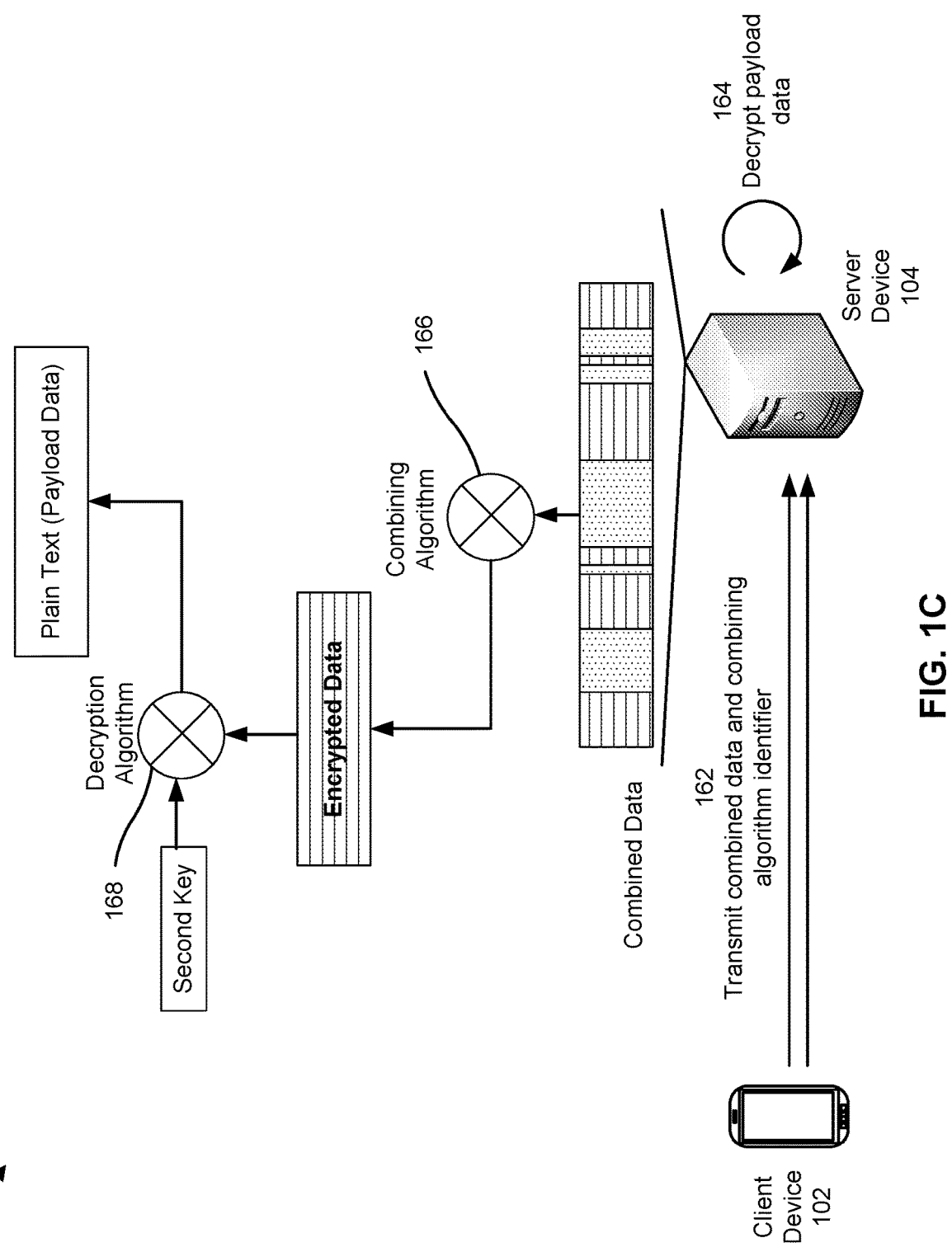

FIGS. 1A-1C are diagrams of an example implementation 100 associated with secure encryption using tokenized data. As shown in FIGS. 1A-1C, example implementation 100 includes a client device 102 and a server device 104. These devices are described in more detail below in connection with FIG. 2 and FIG. 3.

As further shown in FIG. 1A, and by reference number 152, the client device 102 may receive a request to transmit secure information. For example, the client device 102 may receive input, via a user interface, associated with specifying secure information. Secure information may include user authentication data (e.g., a user name or password), financial information (e.g., a credit card number), personal identification information (e.g., a social security number), healthcare data (e.g., a medical record), confidential business data (e.g., intellectual property), private communications (e.g., messages), location data (e.g., Global Positioning System (GPS) coordinates), legal information (e.g., compliance reports), academic data (e.g., research findings), Internet of Things (IoT) data (e.g., sensor data), or recovery data (e.g., a device backup), among other examples.

As further shown in FIG. 1B, and by reference number 154, the client device 102 may identify payload data, of the secure information for transmission, that is to be encrypted. For example, the client device 102 may determine that the information, which is to be transmitted, includes secure information that is to be conveyed as payload data of a message. In other words, the client device 102 may receive a request to transmit a message conveying values for a set of fields and may determine that at least one value of at least one field is to be encrypted for transmission. Although some aspects are described herein in terms of encryption of plain text data (e.g., a social security number or a message), implementations described herein may be applicable to other types of data, such as audio data or video data, among other examples.

As further shown in FIG. 1B, and by reference number 156, the client device 102 may generate encrypted data using an encryption algorithm. For example, the client device 102 may use a first encryption key to encrypt the payload data using an encryption algorithm, thereby generating encrypted data. The encryption algorithm may include a public encryption algorithm, such as a DES algorithm, an AES algorithm, an RSA algorithm, a Blowfish algorithm, or a Twofish algorithm, among other examples. Additionally, or alternatively, the encryption algorithm may use a proprietary encryption algorithm. For example, when the client device 102 is using a secure application for communication (e.g., a secure messaging platform or a secure mobile application), the secure application may implement a proprietary algorithm for encryption (e.g., for which a corresponding decryption algorithm may be available at the server device 104 to enable decryption using a second encryption key).

As further shown in FIG. 1B, and by reference number 158, the client device 102 may generate tokenized data using an encryption algorithm. For example, the client device 102 may use a third encryption key to tokenized data. In some implementations, the client device 102 may generate the tokenized data based on the payload data. For example, the client device 102 may use the payload data as a seed for generating data that is encrypted using the third encryption key, thereby generating a second version of the payload data (e.g., a first version of the payload data being the encrypted data encrypted via the first encryption key, and the second version of the payload data being the tokenized data encrypted via the second encryption key). Additionally, or alternatively, the client device 102 may encrypt another data set. For example, the client device 102 may generate random data and may encrypt the random data using the third encryption key. Additionally, or alternatively, the client device 102 may encrypt a non-random data set (e.g., that is different from the payload data) to generate the tokenized data. In this case, the non-random data set may be generated or selected such that the non-random data set is structurally similar to the payload data. For example, when the payload data is a 10 digit phone number, the non-random data set may be another 10 digit phone number that follows one or more rules for phone number validity (e.g., not starting with the digits "911").

Additionally, or alternatively, the client device 102 may generate a meaningless alphanumeric string for each discrete value or data set within the payload data, such that the alphanumeric string has no inherent value or meaning, thereby representing a tokenization associated with the payload data. In some implementations, the client device 102 may use a tokenization algorithm to generate the data set that is encrypted to generate the tokenized data. In this way, by generating tokenized data that cannot be decrypted into meaningful data (e.g., because the tokenized data is based on, for example, randomly generated data), the tokenized data can prevent malicious actors from decrypting (e.g., using quantum computing) a combined dataset that includes the tokenized data.

In some implementations, the client device 102 may generate a checksum or error correction information and use the checksum or error correction information as the tokenized data (or to generate the tokenized data). For example, the client device 102 may incorporate a checksum and/or an error correction bit as one or more bits of the tokenized data, thereby enabling validation and/or error correction of the payload data by the server device 104. In some implementations, the client device 102 may generate a token (e.g., tokenized data) using plain text of the payload data and a key. In this case, the token can be regenerated during an integrity check (e.g., after the data is decrypted) to reconstruct a random number and validate if the random number is the same as the incoming random number that was part of the tokenized data. In this case, the server device 104 can use the token to determine whether the encrypted data (e.g., the payload data) and the tokenized data was tampered with during transmission.

As further shown in FIG. 1B, and by reference number 160, the client device 102 may generate combined data by combining the encrypted data and the tokenized data using a combining algorithm. For example, the client device 102 may use the combining algorithm to interleave first blocks of data (e.g., one or more bits) from the encrypted data and second blocks of data (e.g., one or more bits) from the tokenized data, thereby merging the two data sets into a single, interleaved dataset.

In some implementations, the client device 102 may select the combining algorithm from a set of possible combining algorithms. For example, the client device 102 may store tens, hundreds, thousands, or millions of different combining algorithms. In this case, each algorithm may be associated with an indicator, such as an identifier value of an entry in a table storing each algorithm. Accordingly, the server device 104 may have access to each algorithm and to the table storing the identifier values, which may enable the server device 104 to determine which combining algorithm was used based on receiving an indicator of the combining algorithm that was used.

In some implementations, the client device 102 may select the combining algorithm based on a random selection procedure. For example, the client device 102 may generate a random number (e.g., using a value for a seed, such as a value in the payload data or in the encrypted data) and use the random number to select the combining algorithm. Additionally, or alternatively, the client device 102 may select the combining algorithm based on a characteristic of the payload data, such as a size of the payload data, a bit within the payload data, a type of payload data, or another characteristic. Additionally, or alternatively, the client device 102 may select the combining algorithm using the payload data. For example, the client device 102 may generate a hash of the payload data and use the hash to select a combining algorithm (e.g., by mapping the hash to an index value of a combining algorithm).

In some implementations, the client device 102 may use a randomly generated algorithm. For example, the client device 102 may be configured with a structure for an algorithm and may randomly generate values for the structure and use the values and the structure to determine how to interleave the encrypted data and the tokenized data. In this case, the client device 102 may generate an indicator of the values (e.g., an explicit indicator of the values or an implicit indicator that identifies a random generation algorithm seed from which the values were generated using, for example, a random number generator).

In some implementations, the client device 102 may divide the encrypted data and/or the tokenized data into chunks to generate the combined data. For example, the client device 102 may select sets of one or more bits from the tokenized data for interleaving into sets of one or more bits of the encrypted data. In this case, a quantity, position, or order of consecutive bits of encrypted data and/or tokenized data may be selected based on the combining algorithm. In other words, the client device 102 may use the combining algorithm to determine sets of bits of tokenized data to insert into sets of bits of encrypted data.

As further shown in FIG. 1C, and by reference number 162, the client device 102 may transmit the combined data and, in some aspects, a combining algorithm identifier. For example, the client device 102 may transmit the combined data and an indicator of the combining algorithm as output data. In some implementations, the client device 102 may transmit the combined data with the combining algorithm identifier. For example, the client device 102 may append the combining algorithm identifier to the combined data (e.g., forming a single continuous string of bits). In this case, the client device 102 and the server device 104 may maintain confidentiality of combining algorithms. In other words, the combining algorithms may be secured such that a malicious actor intercepting a message including the combined data and the combining algorithm identifier cannot determine the combining algorithm and use the combining algorithm on the combined data.

Additionally, or alternatively, the client device 102 may transmit the combined data separate from the combining algorithm identifier. For example, the client device 102 may transmit a first message conveying the combined data and a second message conveying the combining algorithm. In some implementations, the first message and the second message may be conveyed via different messaging pathways. For example, the client device 102 may transmit the first message via the Internet and the second message via a short message service (SMS) message. Additionally, or alternatively, the client device 102 may transmit the first message via a first path (e.g., a first one or more hops) and the second message via a second path (e.g., a second one or more hops), such that the first path and the second path do not completely overlap.

Additionally, or alternatively, the client device 102 may transmit one or more of the first message or the second message via a secured communication channel or an unsecured communication channel. For example, the client device 102 may transmit both the first message and the second message via an end-to-end encrypted channel. Additionally, or alternatively, the client device 102 may transmit the first message via an unsecure channel and the second message (e.g., which may include fewer bits to convey the combining algorithm identifier than is conveyed in the combined data) via a secure channel. In this case, the client device 102 improves an efficiency of channel resource utilization by minimizing an amount of data that is sent via a secured channel relative to all data needing to be sent via a secure channel to ensure data security. In other words, by adding an additional layer of security, the combined data can be transmitted via unsecured channels and the combining algorithm identifier can be transmitted via secured channels (e.g., which may have greater overhead or computational complexity) and a level of security is comparable to or higher than if the payload data was transmitted via a secured channel (e.g., with less overhead or computation complexity as a result of transmitting a small amount of data via the secured channel and the larger remainder of the data via an unsecured channel).

In this case, even if the combining algorithms are known to malicious actors, it may be more difficult to monitor and intercept messages from multiple messaging pathways, thereby preventing the malicious actor from intercepting both the combined data and the combining algorithm identifier. By having a sufficiently large quantity of possible combining algorithms (e.g., discrete, static algorithms or generatable algorithms), the client device 102 and server device 104 may cause a computational complexity of trying each possible combining algorithm (and then attempting to decrypt the payload data) to be less feasible (e.g., even with quantum computing techniques) than is practical for the interception and malicious use of private information. In other words, the use of tokenized data, data combining, and a plurality of different possible combining algorithms adds additional layers of complexity to decrypting secure information, thereby improving data security.

Although some aspects are described herein in terms of transmission of data, it is contemplated that the client device 102 may use techniques described herein to store data. For example, the client device 102 may generate the combined data and store the combined data and an indicator of the combining algorithm to enable secure data storage. In this case, the client device 102 may use the combined data and the indicator of the combining algorithm to recover the payload data from the secure data storage. In some implementations, the client device 102 may store the combined data and/or the indicator of the combining algorithm via an unsecured element or a secured element (e.g., a secured data structure that includes inherent or chip-level cryptography). In some implementations, the client device 102 may store the combined data in a first element and the indicator of the combining algorithm in a second element (e.g., thereby reducing a likelihood that both the combined data and the indicator of the combining algorithm can be maliciously extracted and used to recover the payload data). For example, the client device 102 may store the combined data in an unsecure element and the indicator of the combining algorithm in a secure element, thereby reducing a data storage utilization in the secure element.

As further shown in FIG. 1C, and by reference number 164, the server device 104 may determine to decrypt payload data included in the combined data received from the client device 102. For example, the server device 104 may receive the combined data and the combining algorithm identifier and use the combined data and the combining algorithm identifier to decrypt the payload data. As shown by reference number 166, the server device 104 may extract the encrypted data from the combined data. For example, the server device 104 may use the combining algorithm identifier to determine the combining algorithm used to combine the encrypted data and the tokenized data. In this case, based on determining the combining algorithm, the server device 104 may de-combine the combined data (e.g., by reversing the combining algorithm or via another technique for reversing an algorithmic interleaving of data). For example, based on determining the combining algorithm, the server device 104 may remove the tokenized data from the combined data to recover the encrypted data. In this way, the server device 104 recovers the payload data.

In some implementations, the server device 104 may perform a verification procedure based on recovering the payload data. For example, when the tokenized data is associated with a checksum, the server device 104 may verify that the payload data has been recovered using the tokenized data that has been removed from the combined data as a result of de-combining. Additionally, or alternatively, the server device 104 may perform error correction on the payload data using the tokenized data. For example, based on the checksum failing, the server device 104 may use one or more error correction bits of the tokenized data to error correct the payload data and enable decryption of the payload data.

As further shown in FIG. 1C, and by reference number 168, the server device 104 may decrypt the encrypted data to identify the payload data. For example, the server device 104 may use the second encryption key to decrypt the encrypted data based on extracting the encrypted data from the combined data. In this case, the second encryption key may be a paired key with the first encryption key (e.g., a public key and a corresponding private key). Accordingly, by interleaving the tokenized data with the encrypted data to generate combined data, the second encryption key does not decrypt the combined data but can decrypt the encrypted data once the encrypted data is extracted from the combined data. In this case, based on decrypting the encrypted data, the server device 104 recovers the payload data and can use the secure information that was encrypted from the payload data.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
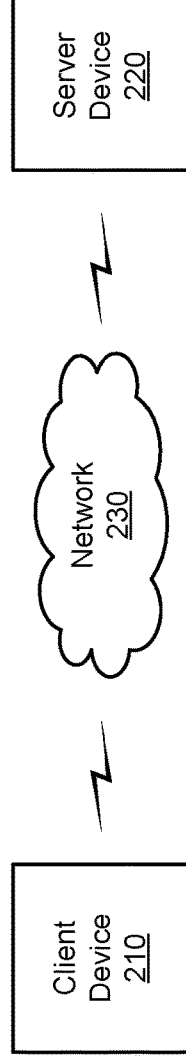
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a client device 210, a server device 220, and a network 230. Devices of environment 200 may interconnect via wired connections, wireless connections, or a combination of wired and wireless connections.

The client device 210 may include one or more devices capable of receiving, generating, storing, processing, and/or providing information associated with secure encryption using tokenized data, as described elsewhere herein. The client device 210 may include a communication device and/or a computing device. For example, the client device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. The client device 210 may be an encryption system that encrypts secure information and combines the secure information with tokenized data. Additionally, or alternatively, the client device 210 may be a decryption system that receives combined data and de-combines and decrypts the combined data.

The server device 220 may include one or more devices capable of receiving, generating, storing, processing, providing, and/or routing information associated with secure encryption using tokenized data, as described elsewhere herein. The server device 220 may include a communication device and/or a computing device. For example, the server device 220 may include a server, such as an application server, a client server, a web server, a database server, a host server, a proxy server, a virtual server (e.g., executing on computing hardware), or a server in a cloud computing system. The server device 220 may be a reception system that receives output data from the client device 210 and de-combines and decrypts the output data. Additionally, or alternatively, the server device 220 may be a transmission system that transmits combined data for de-combination and decryption by the client device 210. In some implementations, the server device 220 may include computing hardware used in a cloud computing environment.

The network 230 may include one or more wired and/or wireless networks. For example, the network 230 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 230 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
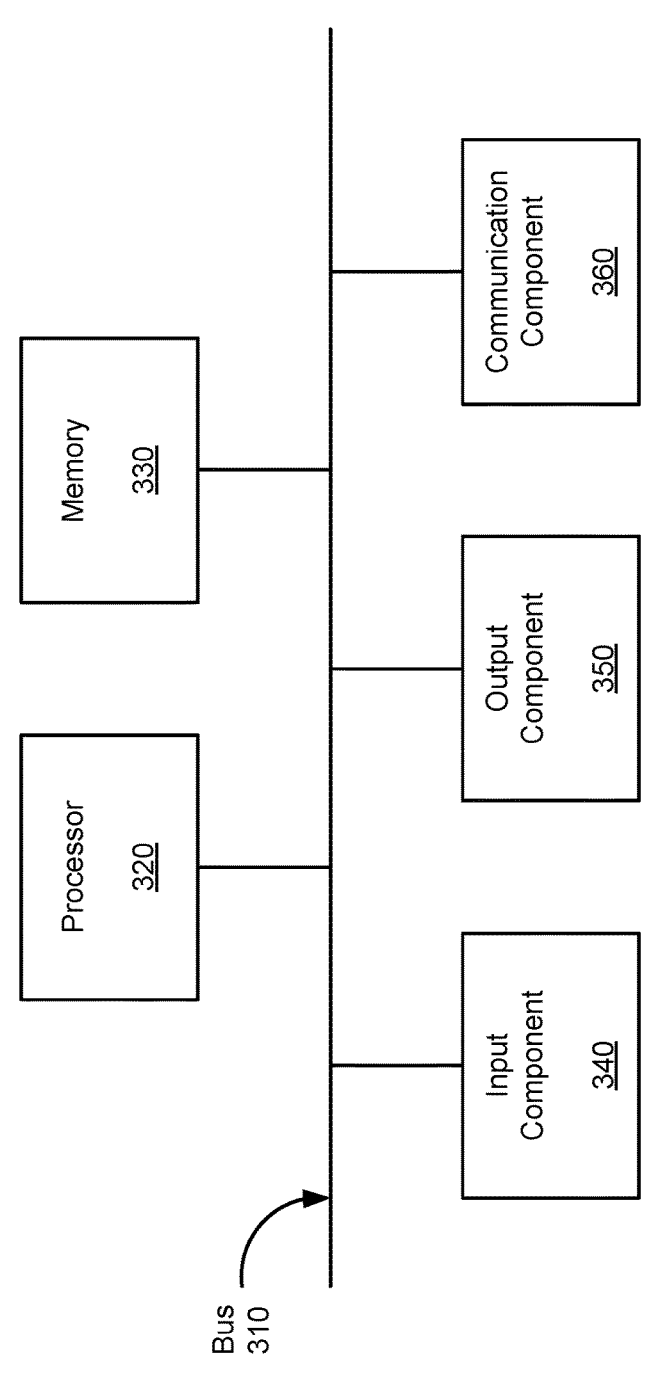
FIG. 3 is a diagram of example components of a device associated with secure encryption using tokenized data, in accordance with some embodiments of the present disclosure.

FIG. 3 is a diagram of example components of a device 300 associated with secure encryption using tokenized data. The device 300 may correspond to the client device 210 and/or the server device 220. In some implementations, the client device 210 and/or the server device 220 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with secure encryption using tokenized data. In some implementations, one or more process blocks of FIG. 4 may be performed by the client device 210. In some implementations, one or more process blocks of FIG. 4 may be performed by another device or a group of devices separate from or including the client device 210, such as the server device 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a request for cryptographic transmission of payload data (block 410). For example, the client device 210 (e.g., using processor 320, memory 330, input component 340, and/or communication component 360) may receive a request for cryptographic transmission of payload data, as described above in connection with reference number 152 of FIG. 1A. As an example, the client device 210 may receive secure information via a user interface and may determine to transmit the secure information to a server device. Accordingly, the client device 210 may determine that the secure information is to be encrypted for transmission to the server device.

As further shown in FIG. 4, process 400 may include obtaining the payload data for encryption (block 420). For example, the client device 210 (e.g., using processor 320 and/or memory 330) may obtain the payload data for encryption, as described above in connection with reference number 154 of FIG. 1B. As an example, the client device 210 may determine that a particular set of bits of the secure information are to be encrypted for transmission.

As further shown in FIG. 4, process 400 may include encrypting the payload data, to generate encrypted payload data, using a first encryption key (block 430). For example, the client device 210 (e.g., using processor 320 and/or memory 330) may encrypt the payload data, to generate encrypted payload data, using a first encryption key, wherein the first encryption key is configured such that the encrypted payload data is decryptable using a second encryption key that corresponds to the first encryption key, as described above in connection with reference number 156 of FIG. 1B. As an example, the client device 210 may encrypt the particular set of bits using a DES algorithm, an AES algorithm, an RSA algorithm, a Blowfish algorithm, or a Twofish algorithm, among other examples.

As further shown in FIG. 4, process 400 may include generating, using a third encryption key, tokenized data (block 440). For example, the client device 210 (e.g., using processor 320 and/or memory 330) may generate, using a third encryption key, tokenized data, as described above in connection with reference number 158 of FIG. 1B. As an example, the client device 210 may generate tokenized data using an encryption algorithm. In some implementations the client device 210 may generate the tokenized data at least in part from the payload data. Additionally, or alternatively, the client device 210 may generate the tokenized data at least in part from non-payload data, such as randomly generated data, a pre-configured data sequence, or another type of data.

As further shown in FIG. 4, process 400 may include combining, using a combining algorithm of a set of combining algorithms, the encrypted payload data and the tokenized data to generate combined data, wherein the combined data is not directly decryptable using the second encryption key (block 450). For example, the client device 210 (e.g., using processor 320 and/or memory 330) may combine, using a combining algorithm of a set of combining algorithms, the encrypted payload data and the tokenized data to generate combined data, wherein the combined data is not directly decryptable using the second encryption key, as described above in connection with reference number 160 of FIG. 1B. As an example, the client device 210 may interleave encrypted data generated from the payload data using the first encryption key and tokenized data to generate a combined block of data.

As further shown in FIG. 4, process 400 may include providing the combined data and an indicator of the combining algorithm as a response to the request (block 460). For example, the client device 210 (e.g., using processor 320 and/or memory 330) may provide the combined data and an indicator of the combining algorithm as a response to the request, as described above in connection with reference number 162 of FIG. 1C. As an example, the client device 210 may transmit the combined block of data, which includes both the encrypted data and the tokenized data interleaved together, to a server device to convey the secure information. In this case, the server device may receive the combined block of data with an indicator of the combining algorithm, which may enable the server device to divide the combined block of data into constituent parts (e.g., into the encrypted data and the tokenized data) and decrypt the secure information from the encrypted data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for cryptographic communication, the system comprising:
  one or more memories; and
  one or more processors, communicatively coupled to the one or more memories, configured to:
    receive payload data for encryption;
    encrypt the payload data, to generate encrypted payload data, using a first encryption key, wherein the first encryption key is configured such that the encrypted payload data is decryptable using a second encryption key that corresponds to the first encryption key;
    generate tokenized data;
    combine, using a combining algorithm, the encrypted payload data and the tokenized data to generate combined data, wherein the combined data is not directly decryptable using the second encryption key;
    output the combined data and an indicator of the combining algorithm;
    receive a request to decrypt the combined data;
    identify, based on receiving the request to decrypt the combined data, the combining algorithm based on the indicator of the combining algorithm;
    remove, based on identifying the combining algorithm, the tokenized data from the combined data, wherein the encrypted payload data is recovered based on removing the tokenized data from the combined data; and
    decrypt the encrypted payload data, to recover the payload data, using the second encryption key based on recovery of the encrypted payload data from the combined data;
    perform a checksum using the removed tokenized data; and
    verify the payload data using the checksum.

2. The system of claim 1, wherein the one or more processors are further configured to:
  append the indicator of the combining algorithm to the combined data to generate output data; and
  wherein the one or more processors, when configured to output the combined data, are configured to:
  output the output data.

3. The system of claim 1, wherein the one or more processors, when configured to output the combined data, are configured to:
  transmit the combined data to a reception system.

4. The system of claim 3, wherein the combined data is conveyed to the reception system via a secured communication channel or an unsecured communication channel.

5. The system of claim 1, wherein the one or more processors, when configured to output the combined data, are configured to:
  store the combined data in a data structure.

6. The system of claim 5, wherein the combined data is stored via a secure element or an unsecured element associated with the data structure.

7. A method of cryptographic communication, comprising:
  receiving, by a device, a request for cryptographic transmission of payload data;
  obtaining, by the device, the payload data for encryption;
  encrypting, by the device, the payload data, to generate encrypted payload data, using a first encryption key, wherein the first encryption key is configured such that the encrypted payload data is decryptable using a second encryption key that corresponds to the first encryption key;
  generating, by the device, tokenized data;
  combining, by the device and using a combining algorithm of a set of combining algorithms, the encrypted payload data and the tokenized data to generate combined data, wherein the combined data is not directly decryptable using the second encryption key; and
  providing, by the device, the combined data and an indicator of the combining algorithm as a response to the request,
  receiving, by the device, a request to decrypt the combined data;
  identifying, by the device and based on receiving the request to decrypt the combined data, the combining algorithm based on the indicator of the combining algorithm;
  removing, by the device and based on identifying the combining algorithm, the tokenized data from the combined data, wherein the encrypted payload data is recovered based on removing the tokenized data from the combined data; and
  decrypting, by the device, the encrypted payload data, to recover the payload data, using the second encryption key based on recovery of the encrypted payload data from the combined data;

performing, by the device, a checksum using the removed tokenized data; and verifying, by the device, the payload data using the checksum.

8. The method of claim 7, further comprising:

selecting the combining algorithm from the set of combining algorithms based on a characteristic of the payload data.

9. The method of claim 7, wherein generating the tokenized data comprises:

encrypting the payload data using a third encryption key to generate the tokenized data.

10. The method of claim 8, wherein combining the encrypted payload data with the tokenized data comprises:

dividing the tokenized data into a set of chunks based on the combining algorithm; and interleaving the set of chunks with the encrypted payload data.

11. The method of claim 7, further comprising:

obtaining a random generation algorithm seed; and generating at least one parameter of the combining algorithm using a random generation algorithm with the random generation algorithm seed applied.

12. The method of claim 7, wherein the first encryption key is a public key and the second encryption key is a corresponding private key.

13. The method of claim 7, wherein outputting the combined data and the indicator of the combining algorithm comprises:

outputting the combined data via a first channel; and outputting the indicator of the combining algorithm via a second channel that is different from the first channel.

14. A non-transitory computer-readable medium storing a set of instructions, the set of instructions comprising:

one or more instructions that, when executed by one or more processors of a device, cause the device to:

receive payload data for encryption;

encrypt the payload data, to generate encrypted payload data, using a first encryption key, wherein the first encryption key is configured such that the encrypted payload data is decryptable using a second encryption key that corresponds to the first encryption key;

encrypt the payload data, to generate tokenized data, using a random encryption key, the random encryption key being different from the first encryption key;

combine, using a combining algorithm, the encrypted payload data and the tokenized data to generate combined data, wherein the combined data is not directly decryptable using the second encryption key;

output the combined data via a first message;

output an indicator of the combining algorithm via a second message;

receive a request to decrypt the combined data;

identify, based on receiving the request to decrypt the combined data, the combining algorithm based on the indicator of the combining algorithm;

remove, based on identifying the combining algorithm, the tokenized data from the combined data, wherein the encrypted payload data is recovered based on removing the tokenized data from the combined data; and decrypt the encrypted payload data, to recover the payload data, using the second encryption key based on recovery of the encrypted payload data from the combined data;

perform a checksum using the removed tokenized data; and verify the payload data using the checksum.

15. The non-transitory computer-readable medium of claim 14, wherein the first message is associated with a first path of a first one or more hops and the second message is associated with a second path of a second one or more hops, the first one or more hops having at least one hop that does not overlap with the second one or more hops.

16. The non-transitory computer-readable medium of claim 14, wherein the one or more instructions, when executed by the one or more processors, cause the device to:

selecting the combining algorithm from a set of combining algorithms based on a hash of the payload data.

17. The system of claim 1, wherein the combining algorithm is selected from a set of combining algorithms based on a characteristic of the payload data.

18. The system of claim 1, wherein the one or more processors, when combining the encrypted payload data with the tokenized data, are configured to:

divide the tokenized data into a set of chunks based on the combining algorithm; and interleave the set of chunks with the encrypted payload data.

19. The non-transitory computer-readable medium of claim 14, wherein the combining algorithm is selected from a set of combining algorithms based on a characteristic of the payload data.

20. A computer-readable medium of claim 14, wherein the one or more instructions, to combine the encrypted payload data with the tokenized data, cause the device to:

divide the tokenized data into a set of chunks based on the combining algorithm; and interleave the set of chunks with the encrypted payload data.

* * * * *